(12) United States Patent
Saitou et al.

(10) Patent No.: US 11,688,937 B2
(45) Date of Patent: Jun. 27, 2023

(54) ANTENNA DEVICE

(71) Applicant: DENSO CORPORATION, Kariya (JP)

(72) Inventors: Takashi Saitou, Nisshin (JP); Hiroaki Maehara, Kariya (JP)

(73) Assignee: DENSO CORPORATION, Kariya (JP)

( * ) Notice: Subject to any disclaimer, the term of this patent is extended or adjusted under 35 U.S.C. 154(b) by 92 days.

(21) Appl. No.: 17/484,298

(22) Filed: Sep. 24, 2021

(65) Prior Publication Data

US 2022/0013898 A1 Jan. 13, 2022

Related U.S. Application Data

(63) Continuation of application No. PCT/JP2020/006486, filed on Feb. 19, 2020.

(30) Foreign Application Priority Data

Mar. 27, 2019 (JP) .............................. JP2019-061698

(51) Int. Cl.
*H04B 1/04* (2006.01)
*H04B 1/38* (2015.01)
*H01Q 1/50* (2006.01)
*H04B 1/3822* (2015.01)

(52) U.S. Cl.
CPC ................. *H01Q 1/50* (2013.01); *H04B 1/04* (2013.01); *H04B 1/3822* (2013.01)

(58) Field of Classification Search
None
See application file for complete search history.

(56) References Cited

U.S. PATENT DOCUMENTS

| | | | |
|---|---|---|---|
| 7,548,070 B2 * | 6/2009 | Forster ................. | G01R 19/165 324/543 |
| 7,675,199 B2 * | 3/2010 | Kuroda .............. | G07C 9/00309 307/125 |
| 7,906,974 B2 * | 3/2011 | Berberich .......... | G01R 31/2829 324/522 |
| 11,055,615 B2 * | 7/2021 | Litichever ............... | H04L 12/40 |
| 11,105,842 B2 * | 8/2021 | Liao ...................... | H03F 3/2173 |
| 11,171,678 B2 * | 11/2021 | Hoang .................... | H04B 1/04 |

(Continued)

FOREIGN PATENT DOCUMENTS

| | | |
|---|---|---|
| JP | 2008131241 A | 6/2008 |
| JP | 2008161019 A | 7/2008 |

(Continued)

*Primary Examiner* — Pablo N Tran
(74) *Attorney, Agent, or Firm* — Harness, Dickey & Pierce, P.L.C.

(57) ABSTRACT

An antenna device includes: multiple H-bridge circuits each of which including a first switch set and a second switch set connected in parallel with one another; a single connection antenna element connected between a point disposed between the two switching elements of the first switch set included in one H-bridge circuit and a point disposed between the two switching elements of the second switch set included in the one H-bridge circuit; and a multiple connection antenna element connected between a point disposed between the two switching elements of the first switch set included in the one H-bridge circuit and a point disposed between the two switching elements of the second switch set included in a different H-bridge circuit.

9 Claims, 8 Drawing Sheets

(56) References Cited

U.S. PATENT DOCUMENTS

| | | | |
|---|---|---|---|
| 11,394,381 B2* | 7/2022 | Shobudani | G01R 31/2812 |
| 2008/0116752 A1 | 5/2008 | Kuroda et al. | |
| 2021/0249976 A1* | 8/2021 | Hashimoto | H02P 7/04 |
| 2021/0350237 A1* | 11/2021 | Litichever | G06N 3/08 |
| 2022/0120931 A1* | 4/2022 | Song | G01V 3/38 |
| 2023/0051731 A1* | 2/2023 | Dent | G01S 13/284 |

FOREIGN PATENT DOCUMENTS

| | | | |
|---|---|---|---|
| JP | 2014082633 A | 5/2014 | |
| JP | 5726353 B1 | 5/2015 | |

* cited by examiner

ANTENNA DEVICE

CROSS REFERENCE TO RELATED APPLICATIONS

The present application is a continuation application of International Patent Application No. PCT/JP2020/006486 filed on Feb. 19, 2020, which designated the U.S. and claims the benefit of priority from Japanese Patent Application No. 2019-061698 filed on Mar. 27, 2019. The entire disclosures of all of the above applications are incorporated herein by reference.

TECHNICAL FIELD

The present disclosure relates to an antenna device, particularly relates to an antenna device including multiple antenna elements.

BACKGROUND

Conventionally, an antenna device including multiple antenna elements and corresponding drive circuits is known.

SUMMARY

The present disclosure provides an antenna device including: multiple H-bridge circuits each of which including a first switch set and a second switch set connected in parallel with one another; a single connection antenna element connected between a point disposed between the two switching elements of the first switch set included in one H-bridge circuit and a point disposed between the two switching elements of the second switch set included in the same H-bridge circuit; and a multiple connection antenna element connected between a point disposed between two switching elements of the first switch set included in one H-bridge circuit and a point disposed between two switching elements of the second switch set included in a different H-bridge circuit.

BRIEF DESCRIPTION OF DRAWINGS

Objects, features and advantages of the present disclosure will become apparent from the following detailed description made with reference to the accompanying drawings. In the drawings.

DETAILED DESCRIPTION

Before describing embodiments of the present disclosure, an antenna device according to a known art will be described.

An H-bridge circuit may be used as a drive circuit for driving an antenna device. In an antenna device according to a known art, an H-bridge circuit is used to drive an LF antenna.

The antenna device includes one H-bridge circuit for one antenna element. Therefore, as the number of antenna elements increases, the number of H-bridge circuits increases correspondingly.

According to an aspect of the present disclosure, an antenna device includes: a plurality of H-bridge circuits each of which including a first switch set and a second switch set connected in parallel with one another, the first switch set including two switching elements connected in series and the second switch set including two switching elements connected in series; a single connection antenna element connected between a point disposed between the two switching elements of the first switch set included in one of the plurality of H-bridge circuits and a point disposed between the two switching elements of the second switch set included in the one of the plurality of H-bridge circuits; and a multiple connection antenna element connected between a point disposed between the two switching elements of the first switch set included in the one of the plurality of H-bridge circuits and a point disposed between the two switching elements of the second switch set included in a different one of the plurality of H-bridge circuits.

In the above antenna device, the multiple connection antenna element is also connected to the same H bridge circuit to which the single connection antenna element is connected. Therefore, the number of H-bridge circuits can be reduced to be smaller than the number of antenna elements.

Since the single connection antenna element is connected between the first switch set and the second switch set of one single H-bridge circuit, a current can alternately flow through the single connection antenna element in reverse directions using the one H-bridge circuit. For example, an alternating current can flow through the single connection antenna element. When the alternating current flows through the single connection antenna element, the single connection antenna element can function as an antenna by transmitting radio waves.

The multiple connection type antenna element is connected between the first switch set of one H-bridge circuit (referred to as a first H-bridge circuit) and a second switch set of another H-bridge circuit (referred to as a second H-bridge circuit). With this configuration, the multiple connection antenna element is connected to a combined H-bridge circuit which includes the first switch set of the first H-bridge circuit as a first switch set and the second switch set of the second H-bridge circuit as a second switch set. By controlling a current to flow through the multiple connection antenna element in reverse directions using the combined H-bridge circuit, the multiple connection antenna elements can function as an antenna.

First Embodiment

Figure 1:
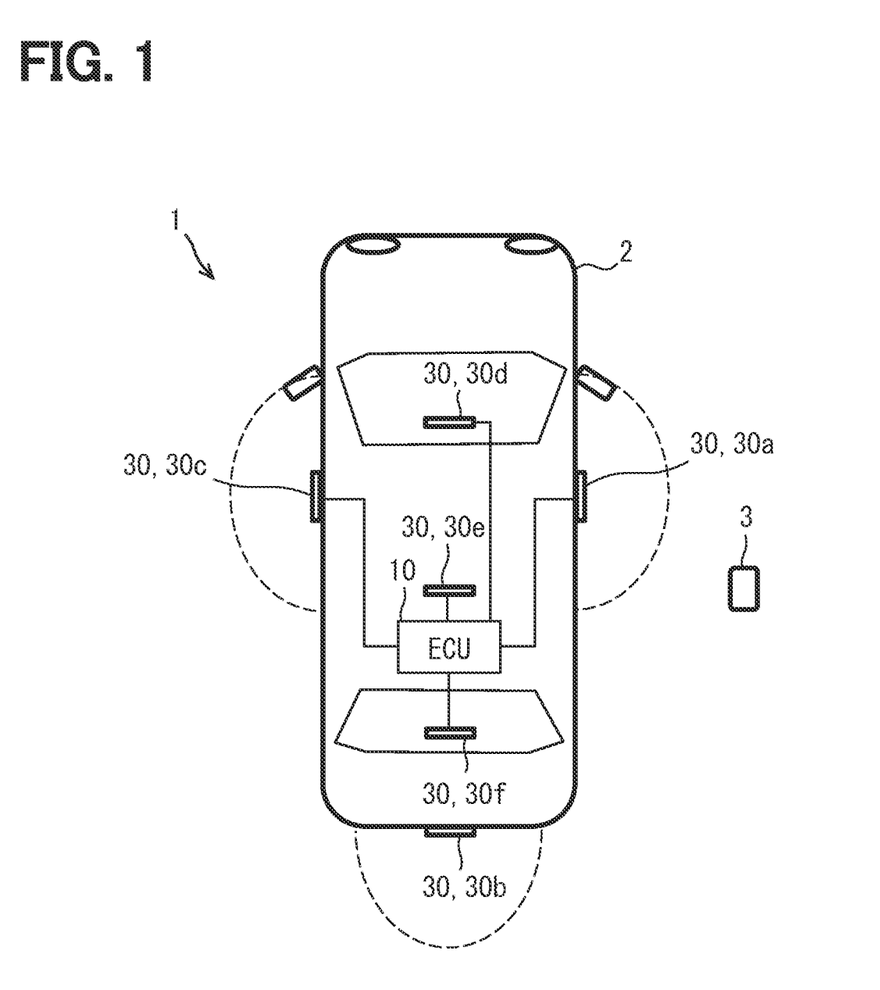
FIG. 1 is a diagram showing a configuration of an antenna device.

The following will describe an embodiment of the present disclosure with reference to the drawings. FIG. 1 is a diagram showing an antenna device 1 according to a first embodiment of the present disclosure. The antenna device 1 is mounted on a vehicle 2. The antenna device 1 includes an electronic control unit (ECU) 10 and six antenna elements 30a, 30b, 30c, 30d, 30e, 30f. When these six antenna elements 30a, 30b, 30c, 30d, 30e, 30f are not distinguished from one another, they are collectively referred to as antenna element 30.

The ECU 10 determines whether a genuine electronic key 3 exists in a communication range of the antenna element 30 when a predetermined operation start condition is satisfied, such as when the vehicle 2 is stopped. For this determination, the ECU 10 controls the antenna element 30 to transmit a signal for detecting an existence of the genuine electronic key 3.

In the present embodiment, an electrical length of the antenna element 30 is an electrical length to transmit and receive radio waves of LF band. The antenna element 30 is not limited to a single element, and may be configured to include multiple elements. A portion of the antenna element 30 which emits radio waves may have various types, such as a coil type or a linear type. The antenna element 30 may include a capacitor, an impedance adjusting resistor, and the like in addition to the portion that emits radio waves.

The antenna element 30a may be located at a handle of a right door of the vehicle 2. The antenna element 30b may be located at a rear end surface of the vehicle 2. The antenna element 30c may be located at a handle of a left door of the vehicle 2. The three antenna elements 30a, 30b, 30c are located in the vicinity of a body of the vehicle 2, and the body of the vehicle 2 is made of metal. Therefore, communication ranges of these three antenna elements 30a, 30b, 30c are formed on an outside of the vehicle 2. In FIG. 1, dashed lines having substantially radial shapes each of which is centered on the corresponding antenna element 30a, 30b, 30c conceptually indicate the communication ranges of the antenna elements 30a, 30b, 30c.

The antenna element 30d may be located at a front end in a compartment of the vehicle 2. The antenna element 30e may be located in the vicinity of a central portion in the compartment of the vehicle 2. The antenna element 30f may be located in the vicinity of an end portion in the compartment of the vehicle 2. The communication ranges of these antenna elements 30d, 30e, 30f are formed in the compartment of the vehicle.

The antenna device 1 is included in a vehicle system that detects the electronic key 3 existing in the compartment of the vehicle 2 or in the vicinity of the vehicle 2. The vehicle system controls the multiple antenna elements 30 included in the antenna device 1 to transmit request signals each of which requests a response from the electronic key 3. The request signals may be transmitted from the multiple antenna elements 30 one by one in a predetermined order, or may be transmitted from the multiple antenna elements 30 at the same time. In response to a reception of the request signal, the electronic key 3 returns a response signal. The response signal is transmitted by radio waves of RF band. The vehicle system further includes an antenna for receiving the response signal from the electronic key 3.

The number and positions of the antenna elements 30 are not limited to the example shown in FIG. 1. The number and positions of the antenna elements 30 may be set to be different from the example shown in FIG. 1 under a condition that the electronic key 3 existing in the compartment of the vehicle or exiting in the vicinity of the vehicle 2 can be detected.

Figure 2:
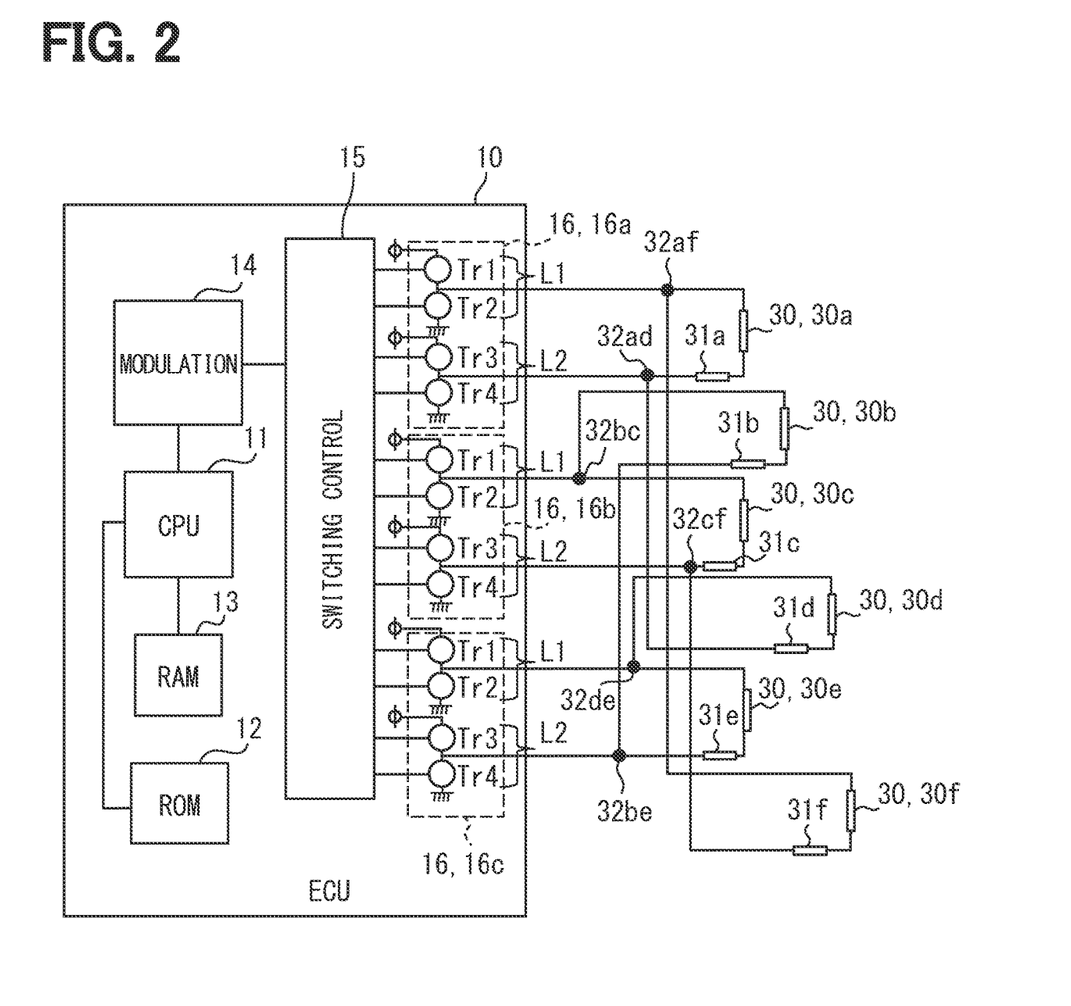
FIG. 2 is a diagram showing a configuration of an ECU.

FIG. 2 shows a configuration of the ECU 10. As shown in FIG. 2, the ECU 10 includes a CPU 11, a ROM 12, a RAM 13, a modulation circuit 14, a switching control circuit 15, and three H-bridge circuits 16a, 16b, 16c. When the three H-bridge circuits 16a, 16b, 16c are not distinguished from one another, they are referred to as H-bridge circuit 16.

The ROM 12 stores a program to be executed by the CPU 11. The CPU 11 performs various functions by executing the program stored in the ROM while using a temporary storage of the RAM 13. One of the functions performed by the CPU 11 is to output a base signal to the modulation circuit 14. The base signal is a signal carried by a carrier wave. The above-mentioned request signal is an example of the base signal.

The modulation circuit 14 generates a carrier wave signal that oscillates at a frequency of the carrier wave, and modulates the base signal with the generated carrier wave signal. The modulation may use ASK modulation method. The carrier wave signal has high level and low level as signal levels. Thus the signal modulated by the modulation circuit 14 has high levels and low levels, and the high and low levels are repeated. The signal in which the high level and the low level are repeated is input to the switching control circuit 15. The switching control circuit 15 can separately turn on or turn off the transistors Tr included in the H-bridge circuit 16. The switching control circuit 15 may be provided by a microcontroller.

Figure 3:
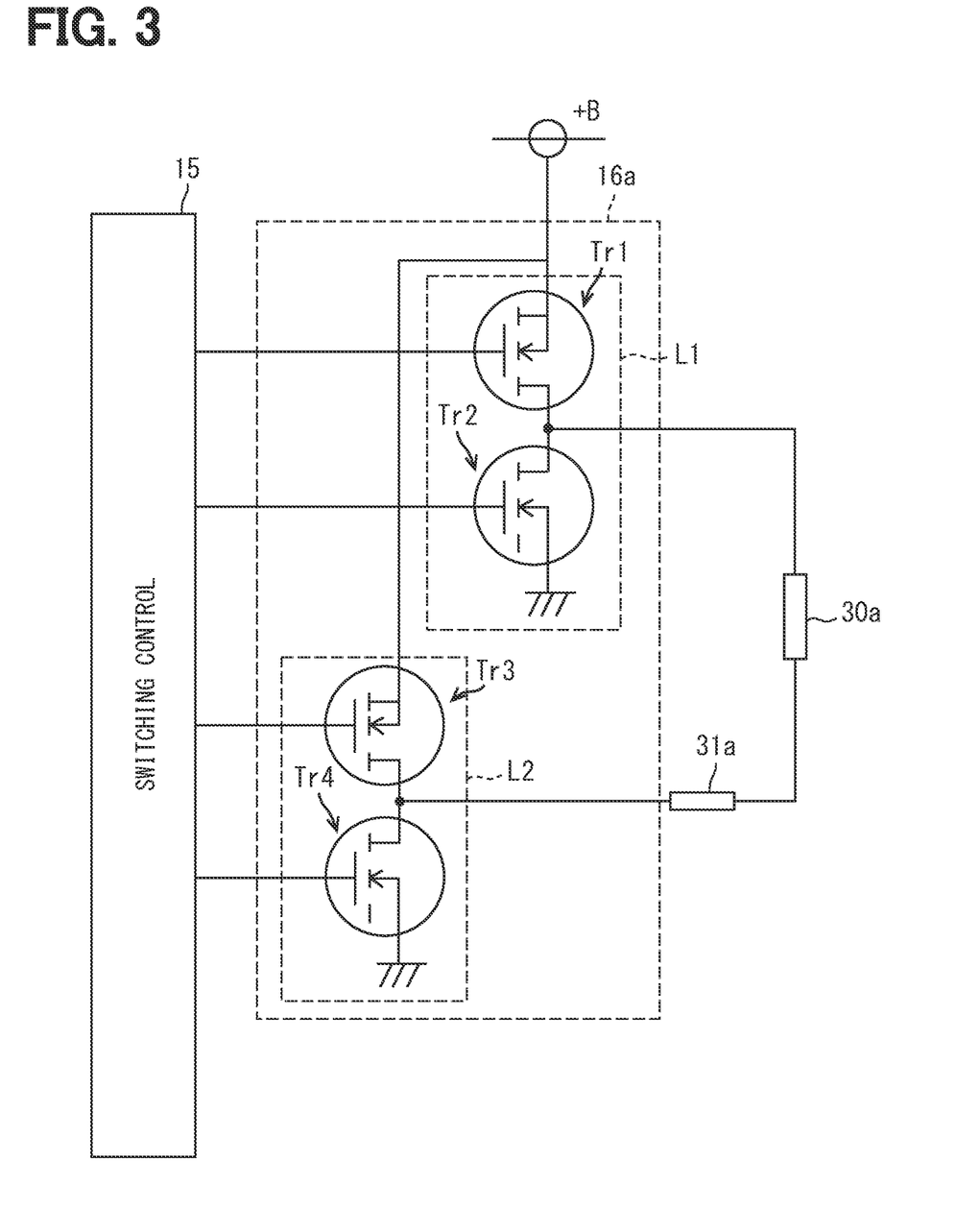
FIG. 3 is a diagram showing a configuration of an H-bridge circuit.

The configuration of the H-bridge circuit 16 will be described with reference to FIG. 3. FIG. 3 shows a configuration of the H-bridge circuit 16a. Other H-bridge circuits 16b and 16c may have the same configuration as that of the H-bridge circuit 16a. As shown in FIG. 3, the H-bridge circuit 16a includes four transistors Tr1, Tr2, Tr3, Tr4 which are switching elements. These four transistors Tr1, Tr2, Tr3, Tr4 may be provided by MOSFETs. In the H-bridge circuit 16 shown in FIG. 3, all of the transistors Tr1, Tr2, Tr3, Tr4 are provided by N-type MOSFETs. As another example, high side transistors Tr1 and Tr3 may be provided by P-type MOSFETs.

The H-bridge circuit 16a includes two switch sets, which include a first switch set L1 and a second switch set L2. The first switch set L1 includes transistors Tr1, Tr2 connected in series with one another, and the second switch set L2 includes transistors Tr3, Tr4 connected in series with one another. The first switch set L1 and the second switch set L2 are connected in parallel with one another.

The transistor Tr1 and the transistor Tr3 are high side transistors that are connected with the power supply. The transistors Tr2 and the transistor Tr4 are low side transistors that are connected to the ground.

One end of the antenna element 30a is connected between a source terminal of the transistor Tr1 and a drain terminal of the transistor Tr2. One end of the antenna element 30f is also connected between the source terminal of the transistor Tr1 and the drain terminal of the transistor Tr2, but the antenna element 30f is omitted in FIG. 3.

The other end of the antenna element 30a is connected between a source terminal of the transistor Tr3 and a drain terminal of the transistor Tr4 via an output adjusting resistor 31a. The output adjusting resistor 31a adjusts an output power of the radio waves to be transmitted by the antenna element 30a. The output adjusting resistor adjusts the output power for corresponding antenna element 30.

The switching control circuit 15 turns on the transistors Tr1 and Tr4 and turns off the transistors Tr2 and Tr3 in response to input of a high level signal that controls the H-bridge circuit 16a as a drive target. As described above, the transistors Tr1, Tr2, Tr3, and Tr4 are included in the H-bridge circuit 16a. As a result, a current flows through the antenna element 30a in a direction from top to bottom on a drawing sheet of FIG. 3. The switching control circuit 15 turns on the transistors Tr2 and Tr3 and turns off the transistors Tr1 and Tr4 of the H-bridge circuit 16a in response to input of a low level signal that controls the H-bridge circuit 16a as a drive target. As a result, a current flows through the antenna element 30a in a direction from bottom to top on the drawing sheet of FIG. 3. As described above, an alternating current flows through the antenna element 30a corresponding to the high level signal and the low level signal input to the switching control circuit 15. Thus, radio waves of LF band are transmitted from the antenna element 30a.

The following description is about FIG. 2. One end of the antenna element 30a is connected between the transistor Tr1 and the transistor Tr2 included in the first switch set L1 of the H-bridge circuit 16a, and the other end of the antenna element 30a is connected between the transistor Tr3 and the transistor Tr4 of the second switch set L2 of the H-bridge circuit 16a.

Both ends of the antenna element 30a are connected to the same H-bridge circuit 16a. The antenna element 30 with both ends connected to the same H-bridge circuit 16 is referred to as a single connection antenna element. Among the remaining five antenna elements 30, the antenna elements 30c, 30e are also single connection antenna elements. One end of the antenna element 30c is connected between the transistor Tr1 and the transistor Tr2 included in the H-bridge circuit 16b, and the other end of the antenna element 30c is connected between the transistor Tr3 and the transistor Tr4 included in the H-bridge circuit 16b. One end of the antenna element 30e is connected between the transistor Tr1 and the transistor Tr2 included in the H-bridge circuit 16c, and the other end of the antenna element 30e is connected between the transistor Tr3 and the transistor Tr4 included in the H-bridge circuit 16c.

Each of the remaining three antenna elements 30b, 30d, 30f has one end connected to one H-bridge circuit 16 and the other connected to a different H-bridge circuit 16. Such an antenna element 30 is referred to as a multiple connection antenna element.

One end of the antenna element 30b is connected between the transistor Tr1 and the transistor Tr2 of the first switch set L1 included in the H-bridge circuit 16b. That is, one end of the antenna element 30b is branched from a line through which the antenna element 30c is connected to the H-bridge circuit 16b. A point from which one end of antenna element 30b branches is also referred to as a branch point 32bc. The other end of the antenna element 30b is connected between the transistor Tr3 and the transistor Tr4 of the second switch set L2 included in the H-bridge circuit 16c. That is, the other end of the antenna element 30b is branched from a line through which the antenna element 30e is connected to the H-bridge circuit 16c. A point from which the other end of antenna element 30b branches is also referred to as a branch point 32be.

One end of the antenna element 30d is connected between the transistor Tr1 and the transistor Tr2 of the first switch set L1 included in the H-bridge circuit 16c. That is, one end of the antenna element 30d is branched from a line through which the antenna element 30e is connected to the H-bridge circuit 16c. A point from which one end of antenna element 30d branches is also referred to as a branch point 32de. The other end of the antenna element 30d is connected between the transistor Tr3 and the transistor Tr4 of the second switch set L2 included in the H-bridge circuit 16a. That is, the other end of the antenna element 30d is branched from a line through which the antenna element 30a is connected to the H-bridge circuit 16a. A point from which the other end of antenna element 30d branches is also referred to as a branch point 32ad.

One end of the antenna element 30f is connected between the transistor Tr1 and the transistor Tr2 of the first switch set L1 included in the H-bridge circuit 16a. That is, one end of the antenna element 30f is branched from a line through which the antenna element 30a is connected to the H-bridge circuit 16a. A point from which one end of antenna element 30f branches is also referred to as a branch point 32af. The other end of the antenna element 30f is connected between the transistor Tr3 and the transistor Tr4 of the second switch set L2 included in the H-bridge circuit 16b. That is, the other end of the antenna element 30f is branched from a line through which the antenna element 30c is connected to the H-bridge circuit 16b. A point from which the other end of antenna element 30f branches is also referred to as a branch point 32cf. Hereinafter, when the six branch points 32bc, 32be, 32de, 32ad, 32af, and 32cf are not distinguished from one another, they are described as branch points 32.

Each output adjusting resistor 31a, 31b, 31c, 31d, 31f is connected in series to the corresponding antenna element 30a, 30b, 30c, 30d, 30e, 30f. When these output adjusting resistors 31a, 31b, 31c, 31d, 31f are not distinguished from one another, they are described as output adjusting resistors 31. Each of the output adjusting resistors 31 is arranged closer to the corresponding antenna element 30 compared with the corresponding branch point 32 on the same line.

As shown in FIG. 2, in the antenna device 1, the number of H-bridge circuits 16 for driving the antenna elements 30 is smaller than the number of antenna elements 30. Specifically, the number of H-bridge circuits 16 is half the number of antenna elements 30. With this configuration in which the number of H-bridge circuits 16 is smaller than the number of antenna elements 30, the antenna device 1 can individually transmit radio waves from all of the antenna elements 30.

(Individual Transmission Operation)

The following will describe the switching control of the transistors Tr executed by the switching control circuit 15 in order to transmit radio waves individually from all of the antenna elements 30.

Figure 4:
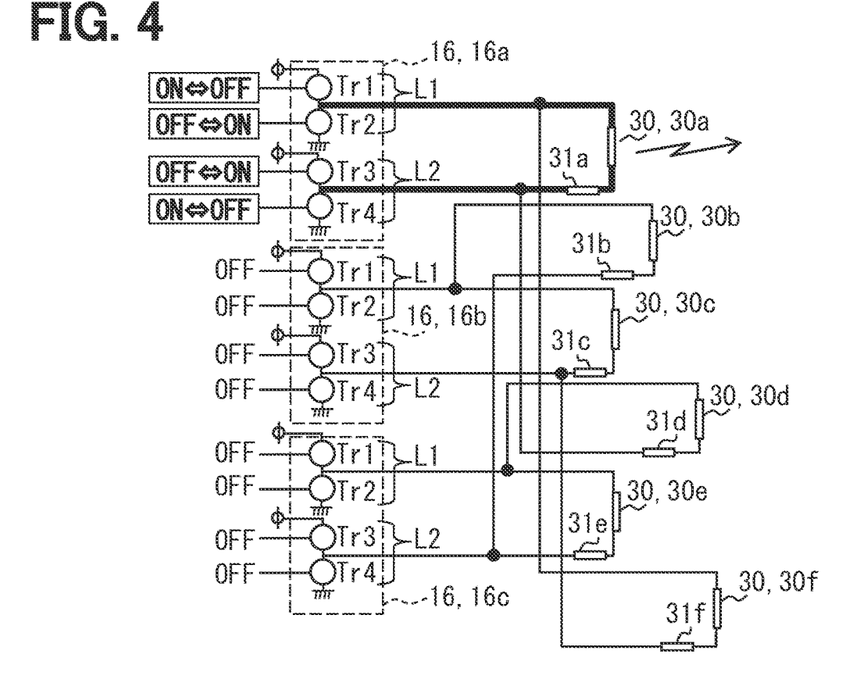
FIG. 4 is a diagram showing a switching control when radio waves are transmitted only by a single antenna element.

The following will describe the switching control of the transistors Tr executed by the switching control circuit 15 when the radio waves are transmitted from only one single connection antenna element. The switching control executed in this case is referred to as a single control. FIG. 4 shows the single control executed by the switching control circuit 15 when the radio waves are transmitted only from the antenna element 30a, which is the single connection antenna element.

As shown in FIG. 4, when the radio waves are transmitted only from the antenna element 30a, all of the transistors Tr included in the H-bridge circuits 16b and 16c maintain off states. When a high level signal is input to the H-bridge circuit 16a, the switching control circuit 15 turns on the transistors Tr1 and Tr4 and turns off the transistors Tr2 and Tr3. When a low level signal is input to the H-bridge circuit 16a, the switching control circuit 15 turns on the transistors Tr2 and Tr3 and turns off the transistors Tr1 and Tr4. As a result, alternating current that fluctuates at the frequency of the LF band flows through the antenna element 30a, so that radio waves of the LF band are transmitted from the antenna element 30a. Further, no radio wave is transmitted from other antenna elements 30. A bold line shown in FIG. 4 indicates a current path when an alternating current flows through the antenna element 30a. A bold line shown in FIG. 5 and subsequent figures also indicates a path through which the current flows when the switching control shown in each figure is carried out.

In the following description, the transistor Tr that turns on in response to input of a high level signal is referred to as the high side transistor Tr, and the transistor Tr that turns on in response to input of a low level signal is referred to as a low side transistor Tr.

When transmitting radio waves from the antenna element 30c, the following two states are alternately repeated. In a first state, the high side transistor Tr of the H-bridge circuit 16b to which the antenna element 30c is connected is turned on and the low side transistor Tr is turned off. In a second state, the low side transistor Tr is turned on and the high side transistor Tr is turned off.

When transmitting radio waves from the antenna element 30e, the following two states are alternately repeated. In a first state, the high side transistor Tr of the H-bridge circuit 16c to which the antenna element 30e is connected is turned on and the low side transistor Tr is turned off. In a second state, the low side transistor Tr is turned on and the high side transistor Tr is turned off.

Figure 5:
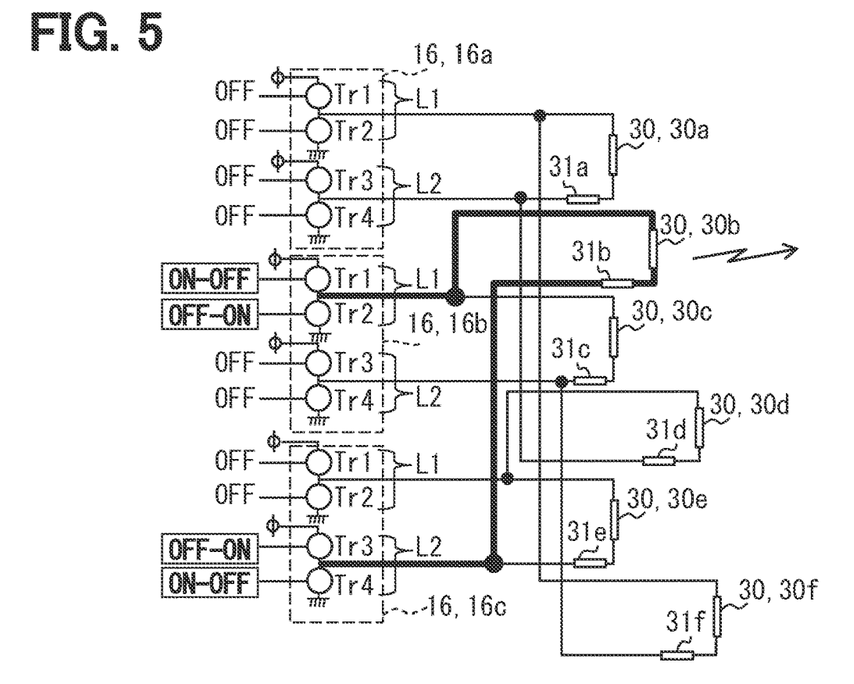
FIG. 5 is a diagram showing a switching control when radio waves are transmitted only by a single antenna element.

The following will describe the switching control of the transistors Tr executed by the switching control circuit 15 when the radio waves are transmitted from only one multiple connection antenna element. The switching control executed in this case is referred to as a multiple control. FIG. 5 shows the multiple control executed by the switching control circuit 15 when the radio waves are transmitted only from the antenna element 30b, which is the multiple connection antenna element.

As shown in FIG. 5, when the radio waves are transmitted only from the antenna element 30b, all of the transistors Tr included in the H-bridge circuit 16a maintain off states. The two transistors Tr included in the second switch set L2 of the H-bridge circuit 16b and the two transistors Tr included in the first switch set L1 of the H-bridge circuit 16c also maintain off states.

The switching control circuit 15 switches on states and off states of the first switch set L1 of the H-bridge circuit 16b and the second switch set L2 of the H-bridge circuit 16c. Specifically, in response to input of a high level signal, the switching control circuit turns on the transistor Tr1 of the H-bridge circuit 16b and the transistor Tr4 of the H-bridge circuit 16c, and turns off the transistor Tr2 of the H-bridge circuit 16b and the transistor Tr3 of the H-bridge circuit 16c. In response to input of a low level signal, the switching control circuit 15 turns on the transistor Tr2 of the H-bridge circuit 16b and the transistor Tr3 of the H-bridge circuit 16c. In response to input of the low level signal, the switching control circuit 15 turns off the transistor Tr1 of the H-bridge circuit 16b and the transistor Tr4 of the H-bridge circuit 16c. As a result, alternating current that fluctuates at the frequency of the LF band flows through the antenna element 30b, so that radio waves of the LF band are transmitted from the antenna element 30b. Further, no radio wave is transmitted from other antenna elements 30.

When radio waves are transmitted from the antenna element 30d, the switching control circuit 15 switches on state and off state of the first switch set L1 of the H-bridge circuit 16c to which one end of the antenna element 30d is connected, and switches on state and off state of the second switch set L2 of H-bridge circuit 16a to which the other end of the antenna element 30d is connected. The switching control of on state and off state is similar to a case where the antenna element 30b transmits the radio waves. The H-bridge circuit 16 to which one end of the antenna element 30d is connected is different from the H-bridge circuit 16 to which the other end of the antenna element 30d is connected. However, one end of the antenna element 30d is connected to the first switch set L1, and the other end of the antenna element 30d is connected to the second switch set L2. Therefore, the first switch set L1 to which one end of the antenna element 30d is connected and the second switch set L2 to which the other end of the antenna element 30d is connected can be regarded as one H-bridge circuit. By controlling the transistor Tr included in this H-bridge circuit to switch on state and off state, radio waves can be transmitted from the antenna element 30d.

When radio waves are transmitted from the antenna element 30f, the switching control circuit 15 switches on state and off state of the first switch set L1 of the H-bridge circuit 16a to which one end of the antenna element 30f is connected, and switches on state and off state of the second switch set L2 of H-bridge circuit 16b to which the other end of the antenna element 30f is connected.

In the above description, each of the antenna elements 30a, 30b, 30c, 30d, 30e, 30f can operate independently from one another to transmit the radio waves.

(Concurrent Transmission Operation)

Figure 6:
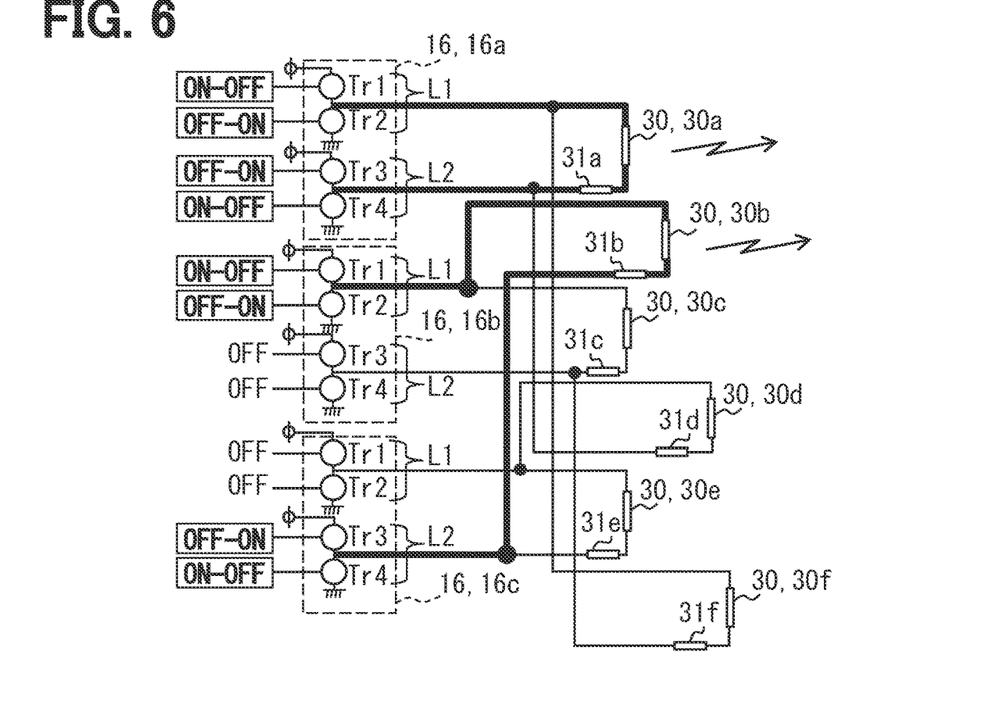
FIG. 6 is a diagram showing a switching control when radio waves are transmitted by multiple antenna elements.

The antenna device 1 can also transmit radio waves from multiple antenna elements 30 at the same time. FIG. 6 shows the switching operation of the transistors Tr when radio waves are concurrently transmitted from one single connection antenna element and one multiple connection antenna element.

In the example shown in FIG. 6, the single connection antenna element is the antenna element 30a, and the multiple connection antenna element is the antenna element 30b. The transistors Tr for operating the two antenna elements 30a and 30b do not overlap with one another. When the transistors Tr are turned on to operate the two antenna elements 30a and 30b, no current flows through other antenna elements 30. Therefore, when radio waves are transmitted from these two antenna elements 30a and 30b at the same time, the phase of the current flowing through the two antenna elements 30a and 30b can be set without any limitation.

When the antenna element 30a and the antenna element 30b concurrently transmit radio waves, the switching control circuit 15 executes a first concurrent control in order to transmit the radio waves from the antenna element 30a. Together with the first concurrent control, the switching control circuit 15 executes a second concurrent control in order to transmit radio waves from the antenna element 30b.

The first concurrent control is similar to the single control described with reference to FIG. 4 in the above description. The second concurrent control is executed at the same time with the first concurrent control. In the first concurrent control, the switching control is not executed to the transistors Tr that are controlled to be turned on or off in the second concurrent control. This point of the first concurrent control is different from the single control.

The second concurrent control is similar to the multiple control described with reference to FIG. 5 in the above description. In the second concurrent control, the switching control is not executed to the transistors Tr that are controlled to be turned on or off in the first concurrent control. This point of the second concurrent control is different from the multiple control.

In the example shown in FIG. 6, when the transistors Tr1 and Tr4 connected to the antenna element 30a are in the on states, the transistors Tr1 and Tr4 connected to the antenna element 30b are also in the on states. When the transistors Tr2 and Tr3 connected to the antenna element 30a are in the on states, the transistors Tr2 and Tr3 connected to the antenna element 30b are also in the on states. In this case, the radio waves transmitted from the antenna elements 30a and 30b have the same phase.

Figure 7:
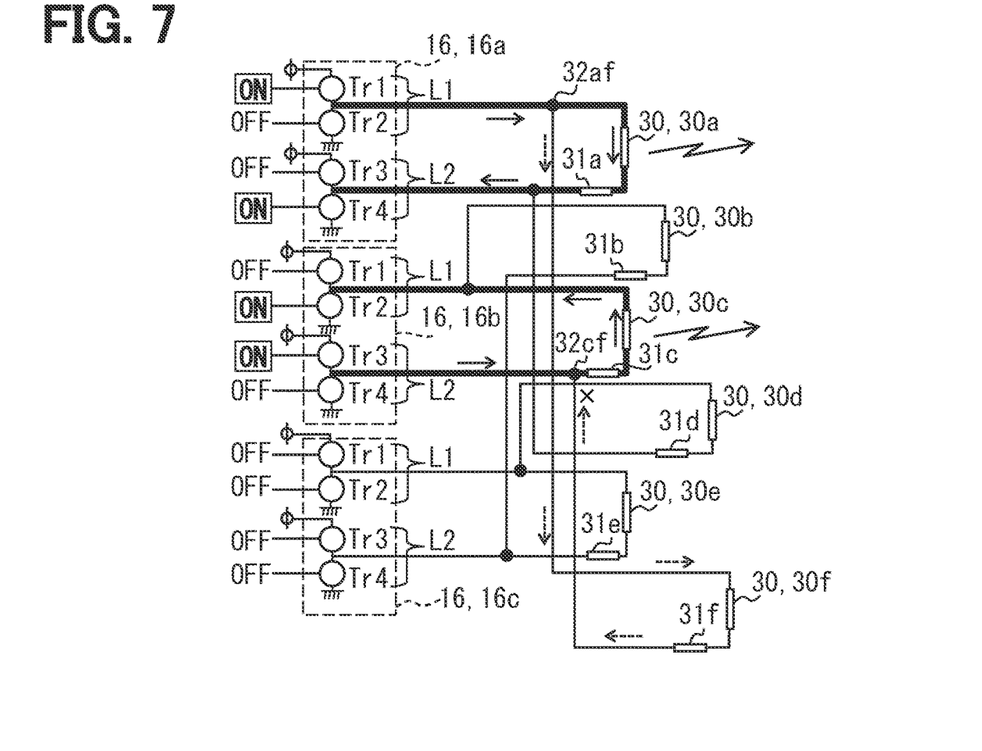
FIG. 7 is a diagram showing a switching control when radio waves are transmitted by multiple antenna elements.
Figure 8:
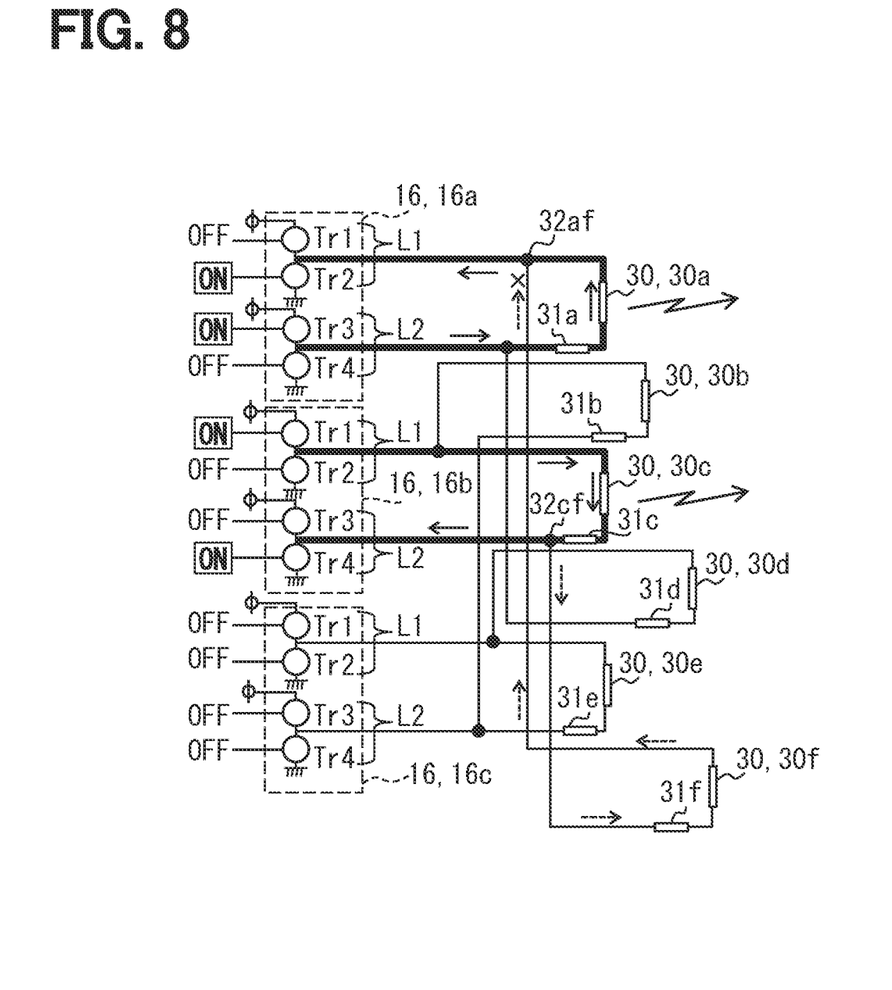
FIG. 8 is a diagram showing a switching control when radio waves are transmitted by multiple antenna elements.

FIG. 7 and FIG. 8 show the operations when radio waves are transmitted from two single connection antenna elements. When transmitting radio waves from two single connection antenna elements at the same time, the switching control circuit 15 executes a reverse phase concurrent control. FIG. 7 and FIG. 8 are diagrams showing reverse phase concurrent control when radio waves are concurrently transmitted from the antenna elements 30a and 30c both of which are single connection antenna elements.

The H-bridge circuits 16 including the transistors Tr that operate the two antenna elements 30a and 30c are provided by the H-bridge circuit 16a and the H-bridge circuit 16b. The H-bridge circuit 16a corresponds to a first H-bridge circuit, and the H-bridge circuit 16b corresponds to a second H-bridge circuit.

Not only the antenna elements 30a and 30c, but also the antenna element 30b transmits the radio waves when the transistors Tr included in the two H-bridge circuits 16a and 16b are operated. Therefore, when transmitting radio waves only from the two antenna elements 30a and 30c without from the antenna element 30b, it is necessary to reverse the phase of the current flowing through the antenna element 30a relative to the phase of the current flowing through the antenna element 30c. By repeating the state shown in FIG. 7 and the state shown in FIG. 8, the current flowing through the antenna element 30a can have a reversed phase relative to the phase of current flowing through the antenna element 30c.

The switching control circuit 15 operates in the state shown in FIG. 7 when a high level signal is input. In the state shown in FIG. 7, in the H-bridge circuit 16a to which the antenna element 30a is connected, the high side transistor Tr1 of the first switch set L1 and the low side transistor Tr4 of the second switch set L2 maintain on states. In the state shown in FIG. 7, in the H-bridge circuit 16b to which the antenna element 30c is connected, the low side transistor Tr2 of the first switch set L1 and the high side transistor Tr3 of the second switch set L2 maintain on states.

With above operation, currents flow through the antenna elements 30a and the antenna element 30c in respective directions shown by corresponding arrows in FIG. 7. At this time, it seems that a current also flows through the antenna element 30f in the direction indicated by a broken line arrow in FIG. 7. This is because the current also flows through the branch points 32cf and 32cf to which the antenna element 30f is connected.

However, in the state shown in FIG. 7, a voltage of the line between the transistor Tr3 of the H-bridge circuit 16b and the output adjusting resistor 31c is higher than a voltage at a point between the output adjusting resistor 31f and the branch point 32cf. Therefore, no current flows through the antenna element 30f.

The switching control circuit 15 operates in the state shown in FIG. 8 when a low level signal is input. In the state shown in FIG. 8, in the H-bridge circuit 16a to which the antenna element 30a is connected, the low side transistor Tr2 of the first switch set L1 and the high side transistor Tr3 of the second switch set L2 maintain on states. In the state shown in FIG. 8, in the H-bridge circuit 16b to which the antenna element 30c is connected, the high side transistor Tr1 of the first switch set L1 and the low side transistor Tr4 of the second switch set L2 maintain on states.

With above operation, currents flow through the antenna elements 30a and the antenna element 30c in respective directions shown by corresponding arrows in FIG. 8. At this time, it seems that a current also flows through the antenna element 30f in the direction indicated by a broken line arrow in FIG. 8. However, in the state shown in FIG. 8, a voltage of the line between the transistor Tr2 of the H-bridge circuit 16a and the antenna element 30a is higher than a voltage at a point between the output adjusting resistor 31f of the antenna element 30f and the branch point 32cf. Therefore, no current flows through the antenna element 30f in the state shown in FIG. 8.

As described with reference to FIG. 7 and FIG. 8, radio waves are transmitted only from the two antenna elements 30a and 30c by controlling the current that flows through the antenna element 30a to have a reversed phase relative to the phase of the current that flows through the antenna element 30c.

The antenna device 1 of the first embodiment described above includes six antenna elements 30 and three H-bridge circuits 16. Thus, the number of H-bridge circuits 16 is half of the number of antenna elements 30. Therefore, the number of H-bridge circuits 16 can be reduced to be smaller than the number of antenna elements 30.

When driving the antenna elements 30a, 30c, 30e, which are single connection antenna elements, the single control described with reference to FIG. 4 is executed to the H-bridge circuits 16 to which the antenna elements 30a, 30c, 30e are connected, respectively.

When driving the antenna elements 30b, 30d, 30f, which are multiple connection antenna elements, the multiple control described with reference to FIG. 5 is executed to the first switch set L1 and the second switch set L2 to which each of the antenna elements 30b, 30d, 30f are connected. By executing the single control and multiple control, all of the antenna elements 30 can be individually driven even if the number of H-bridge circuits 16 is smaller than the number of antenna elements 30.

As described with reference to FIG. 6, the antenna device 1 executes the first concurrent control and the second concurrent control at the same time in order to concurrently transmit radio waves from one single connection antenna element and from one multiple connection antenna element. Further, as described with reference to FIG. 7 and FIG. 8, the antenna device 1 can concurrently transmit radio waves from two single connection antenna elements by executing the reverse phase concurrent control. Therefore, the antenna device 1 can transmit radio waves from any two antenna elements 30 at the same time. By transmitting radio waves from the two antenna elements 30 at the same time, the electronic key 3 can be detected at an early stage, and various application controls can be executed.

The antenna device 1 includes the output adjusting resistor 31 for adjusting the output of the antenna element 30, and the output adjusting resistor 31 is disposed between the antenna element 30 and the branch point 32. By arranging the output adjusting resistor 31 between the antenna element 30 and the branch point 32, the power of the radio waves transmitted from each antenna element 30 can be adjusted by the corresponding output adjusting resistor 31.

Second Embodiment

The following will describe a second embodiment of the present disclosure. In the following description of the second embodiment, elements having the same reference symbols as those used so far are the same as the elements having the same reference symbols in the previous embodiment, except when specifically mentioned. When only a part of the configuration is described, the embodiment described above can be applied to other parts of the configuration.

Figure 9:
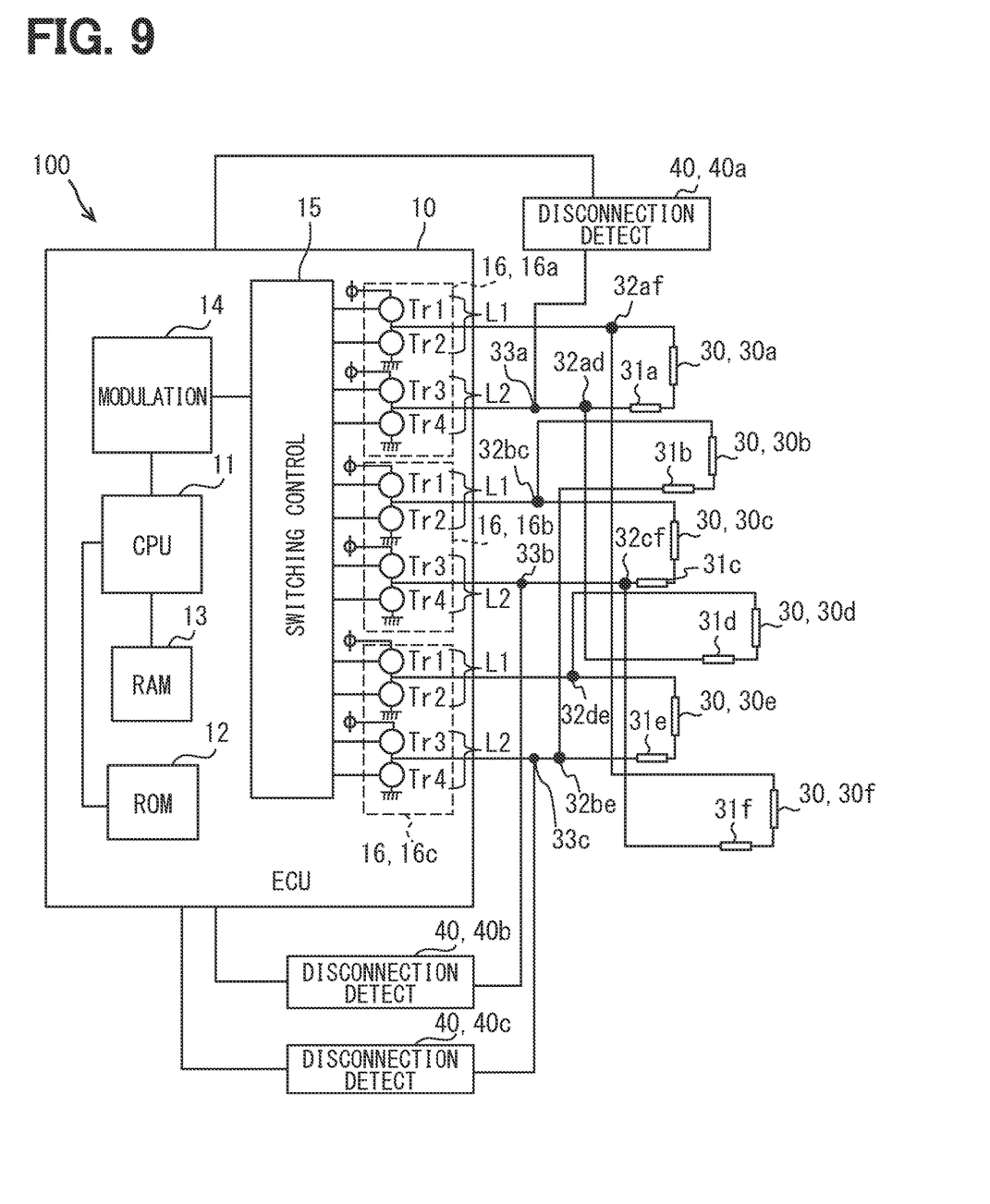
FIG. 9 is a diagram showing a configuration of an antenna device.

FIG. 9 shows a configuration of an antenna device 100 according to the second embodiment. The antenna device 100 is different from the antenna device 1 of the first embodiment in that the antenna device 100 includes three disconnection detection circuits 40a, 40b, 40c. When these three disconnection detection circuits 40a, 40b, 40c are not distinguished from one another, they are described as the disconnection detection circuit 40. FIG. 9 shows a configuration in which the disconnection detection circuit 40 is located separate from the ECU 10 for convenience. Alternatively, the disconnection detection circuit 40 may be included in the ECU 10.

The disconnection detection circuit 40a detects a voltage at a connection point 33a. Relative to the antenna elements 30a and 30d, the connection point 33a is disposed farther than the branch point 32ad. When the antenna element 30a or 30d operates, a current flows through the connection point 33a. Therefore, by detecting the voltage at the connection point 33a, the disconnection detection circuit 40a can detect a disconnection occurring in the line through which the two antenna elements 30a, 30d are connected to the H-bridge circuit 16.

The disconnection detection circuit 40b detects a voltage at a connection point 33b. Relative to the antenna elements 30c and 30f, the connection point 33b is disposed farther than the branch point 32cf. When the antenna element 30c or 30f operates, a current flows through the connection point 33b. Therefore, by detecting the voltage at the connection point 33b, the disconnection detection circuit 40b can detect a disconnection occurring in the line through which the two antenna elements 30c, 30f are connected to the H bridge circuit 16.

The disconnection detection circuit 40c detects a voltage at the connection point 33c. Relative to the antenna elements 30b and 30e, the connection point 33c is disposed farther than the branch point 32be. When the antenna element 30b or 30e operates, a current flows through the connection point 33c. Therefore, by detecting the voltage at the connection point 33c, the disconnection detection circuit 40c can detect a disconnection occurring in the line through which the two antenna elements 30b, 30e are connected to the H bridge circuit 16.

Figure 10:
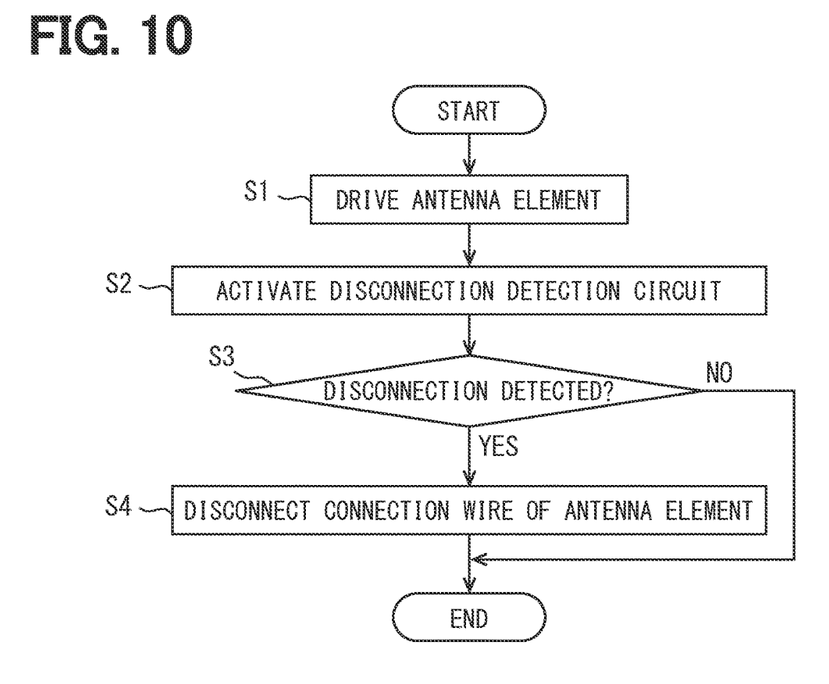
FIG. 10 is a flowchart showing a disconnection detection process executed by a CPU.

FIG. 10 shows a disconnection detection process executed by the CPU 11 in order to detect a disconnection occurring in the line through which the antenna element 30a is connected to the H-bridge circuit 16. The disconnection detection process shown in FIG. 10 is executed every disconnection detection cycle during an activation state of the ECU 10. The disconnection detection cycle may be properly set based on circuit parameters.

In S1, an instruction for driving the antenna element 30a is output to the switching control circuit 15. In S2, the disconnection detection circuit 40a is activated. In S3, a detection result is acquired from the disconnection detection circuit 40a, and the process determines whether a disconnection is occurred based on the detection result. In response to determining occurrence of the disconnection, the process proceeds to S4. In S4, a connection wire of the antenna element 30a is disconnected. When the disconnection is detected, a predetermined process in response to the disconnection detection is executed by, for example, activating and displaying a warning light on an instrument panel of the vehicle 2. When no disconnection is detected in S3, the process shown in FIG. 10 is terminated without executing S4.

The CPU 11 executes the same process for the antenna elements 30c and 30e, and detects a disconnection of the line through which the antenna elements 30c and 30e are connected to the respective H bridge circuits 16. The process of detecting the disconnection of the multiple lines through which the antenna elements 30a, 30c, and 30e are connected to the respective H-bridge circuits 16 may be executed at different time zones or at the same time.

Figure 11:
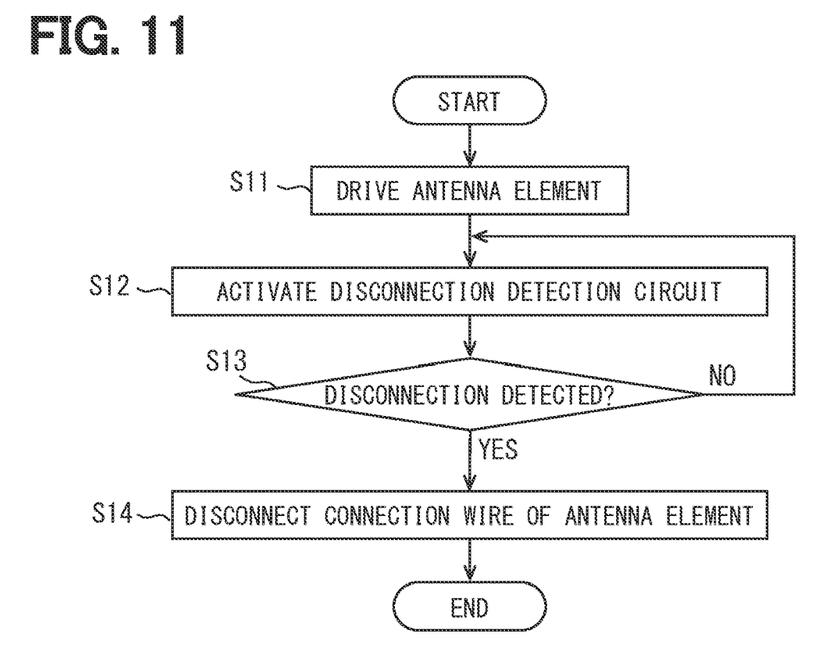
FIG. 11 is a flowchart showing a disconnection detection process executed by a CPU.

The process shown in FIG. 11 is a disconnection detection process executed by the CPU 11. FIG. 11 shows a disconnection detection process executed by the CPU 11 in order to detect a disconnection occurring in the line through which the antenna element 30b is connected to the H-bridge circuit 16. The disconnection detection process for detecting the disconnection occurring in the line through which the antenna elements 30d and 30f are connected to the respective H-bridge circuits 16 is the same as the process shown in FIG. 11.

The disconnection detection process shown in FIG. 11 is executed every disconnection detection cycle during the activation state of the ECU 10. In the present embodiment, in an executing state of the disconnection detection process to the line through which the antenna element 30a is connected to the H-bridge circuit 16, the disconnection detection process of the line through which the antenna element 30d is connected to the H-bridge circuit 16 is controlled to be deactivated. In an executing state of the disconnection detection process to the line through which the antenna element 30c is connected to the H-bridge circuit 16, the disconnection detection process of the line through which the antenna element 30f is connected to the H-bridge circuit 16 is controlled to be deactivated. In an executing state of the disconnection detection process to the line through which the antenna element 30e is connected to the H-bridge circuit 16, the disconnection detection process of the line through which the antenna element 30b is connected to the H-bridge circuit 16 is controlled to be deactivated.

In S11, an instruction for driving the antenna element 30b is output to the switching control circuit 15. In S12, the disconnection detection circuit 40c is activated. In S13, a detection result is acquired from the disconnection detection circuit 40c, and the process determines whether a disconnection is occurred based on the detection result. In response to determining occurrence of the disconnection, the process proceeds to S14. In S14, a connection wire of the antenna element 30b is disconnected. When no disconnection is detected in S13, the process shown in FIG. 11 is terminated without executing S14.

The antenna device 100 of the second embodiment described above includes six antenna elements 30 and three disconnection detection circuits 40. Thus, the number of disconnection detection circuits 40 is half of the number of antenna elements 30. By connecting the three disconnection detection circuits 40, respectively, to the connection points 33a, 33b, 33c as shown in FIG. 9, and executing the disconnection detection process shown in FIG. 10 and FIG. 11, it is possible to detect a disconnection of the line through which each of six antenna elements 30 is connected to the corresponding H-bridge circuit 16.

Although the embodiments have been described above, the disclosed technology is not limited to the above-described embodiment, and the following modifications are included in the present disclosure, and various modifications can be made without departing from the spirit of the present disclosure.

(First Modification)

For example, the antenna element 30 included in the antenna device 1, 100 transmit radio waves in LF band. Alternatively, the frequency of radio waves transmitted by the antenna element 30 may be other than the LF band.

(Second Modification)

In the above embodiments, the number of antenna elements 30 included in the antenna device 1, 100 is six, and the number of H-bridge circuits 16 included in the antenna device 1, 100 is half of the number of antenna elements 30. Alternatively, under a condition that the number of antenna elements 30 is plural, the number may be other than six. Alternatively, the number of H-bridge circuits 16 may be set to be smaller than that of the antenna elements 30, except half of the number of antenna elements 30.

(Third Modification)

In the above embodiments, the output adjusting resistors 31 are provided to all of the antenna elements 30. Alternatively, the output adjusting resistor 31 may be provided only to partial antenna elements 30.

(Fourth Modification)

In the above embodiments, the CPU 11 executes the disconnection detection process. Alternatively, the switching control circuit 15 may execute the disconnection detection process.

(Fifth Modification)

In the above embodiments, as the concurrent transmission operation, the operation of transmitting radio waves from two antenna elements 30 at the same time has been described. Alternatively, radio waves may be transmitted from three or more antenna elements 30 at the same time.

(Sixth Modification)

In the above concurrent transmission operation described with reference to FIG. 6, the respective phases of the radio waves transmitted from the two antenna elements 30 do not affect the concurrent transmission. Therefore, the switching operation of the transistors Tr may be controlled so that the phases of the radio waves transmitted from the two antenna elements 30 are reverse to one another.

(Seventh Modification)

The ECU 10 and the process executed by the ECU 10 in the present disclosure may be implemented by a special purpose computer including a processor programmed to perform one or more functions embodied by a computer program. Alternatively, the ECU 10 and the process executed by the ECU 10 described in the present disclosure may be implemented by a dedicated hardware logic circuit. Alternatively, the ECU 10 and the process executed by the ECU 10 in the present disclosure may be implemented by one or more dedicated computers configured by a combination of a processor executing a computer program and one or more hardware logic circuits. The hardware logic circuits may be, for example, ASIC or FPGA.

The storage medium for storing the computer program is not limited to the ROM 12. Alternatively, the computer program may be stored in a computer-readable, non-transitory tangible storage medium as instructions to be executed by a computer. For example, the program may be stored in a flash memory.

It is noted that a flowchart or the process of the flowchart in the present disclosure includes multiple steps (also referred to as sections), each of which is represented, for example, as S1. Further, each step can be divided into several sub-steps while several steps can be combined into a single step.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An antenna device comprising:
a plurality of H-bridge circuits each of which including a first switch set and a second switch set connected in parallel with one another, the first switch set including two switching elements connected in series and the second switch set including two switching elements connected in series, the plurality of H-bridge circuits including a first H-bridge circuit and a second H-bridge circuit;
a single connection antenna element connected between a point disposed between the two switching elements of the first switch set included in the first H-bridge circuit and a point disposed between the two switching elements of the second switch set included in the first H-bridge circuit;
a multiple connection antenna element connected between a point disposed between the two switching elements of the first switch set included in the first H-bridge circuit and a point disposed between the two switching elements of the second switch set included in the second H-bridge circuit; and
a switching control circuit controlling a switching operation of the switching elements in response to an input of a high level signal or a low level signal to the switching control circuit,
wherein
the switching control circuit executes a single control to the single connection antenna element such that a current alternatively flows through the single connection antenna element in reverse directions as follows,
for the first H-bridge circuit to which the single connection antenna element is connected,
in response to the input of the high level signal, the switching control circuit turns on the switching element disposed on a high side in the first switch set and the switching element disposed on a low side in the second switch set, and turns off the remaining switching elements, and
in response to the input of the low level signal, the switching control circuit turns on the switching element disposed on a low side in the first switch set and the switching element disposed on a high side in the second switch set, and turns off the remaining switching elements,
the switching control circuit executes a concurrent control to the single connection antenna element and the multiple connection antenna element at the same time,
in the concurrent control, the switching control circuit controls a current to alternatively flow through the single connection antenna element in reverse directions as follows,
for the first H-bridge circuit to which the single connection antenna element is connected, in response to the input of the high level signal, the switching control circuit turns on the switching element disposed on the high side in the first switch set and the switching element disposed on the low side in the second switch set, and in response to the input of the low level signal, the switching control circuit turns on the switching element disposed on the low side in the first switch set and the switching element disposed on the high side in the second switch set; and in the concurrent control, the switching control circuit controls a current to alternatively flow through the multiple connection antenna element in reverse directions as follows, for the first switch set and the second switch set to which the multiple connection antenna element is connected, in response to the input of the high level signal, the switching control circuit turns on the switching element disposed on the high side in the first switch set and the switching element disposed on the low side in the second switch set, and in response to the input of the low level signal, the switching control circuit turns on the switching element disposed on the low side in the first switch set and the switching element disposed on the high side in the second switch set.

2. The antenna device according to claim 1, wherein the plurality of H-bridge circuits further include a third H-bridge circuit to which another single connection antenna element is connected, the switching control circuit executes a reverse phase concurrent control as follows, in response to the input of the high level signal, for the first H-bridge circuit, the switching control circuit turns on the switching element disposed on the high side in the first switch set and the switching element disposed on the low side in the third switch set, and turns off the remaining switching elements, for the third H-bridge circuit, the switching control circuit turns on the switching element disposed on the low side in the first switch set and the switching element disposed on the high side in the second switch set, and turns off the remaining switching elements, and turns off the remaining switching elements, and in response to the input of the low level signal, for the first H-bridge circuit, the switching control circuit turns on the switching element disposed on the low side in the first switch set and the switching element disposed on the high side in the second switch set, and turns off the remaining switching elements, for the third H-bridge circuit, the switching control circuit turns on the switching element disposed on the high side in the first switch set and the switching element disposed on the low side in the second switch set, and turns off the remaining switching elements.

3. The antenna device according to claim 1, wherein the switching control circuit executes a multiple control to the multiple connection antenna element such that a current alternatively flows through the multiple connection antenna element in reverse directions as follows, for the first switch set and the second switch set to which the multiple connection antenna element is connected, in response to the input of the high level signal, the switching control circuit turns on the switching element disposed on the high side in the first switch set and the switching element disposed on a low side in the second switch set, and turns off the remaining switching elements, and in response to the input of the low level signal, the switching control circuit turns on the switching element disposed on the low side in the first switch set and the switching element disposed on a high side in the second switch set, and turns off the remaining switching elements.

4. The antenna device according to claim 1, wherein each of the plurality of H-bridge circuits includes a branch point where a line to which the multiple connection antenna element is connected branches from a line to which the single connection antenna element is connected, and relative to the branch point, an output adjusting resistor is connected to at least one of a line between the branch point and the single connection antenna element or a line between the branch point and the multiple connection antenna element closer to the single connection antenna element or the multiple connection antenna element.

5. The antenna device according to claim 1, wherein each of the plurality of H-bridge circuits includes a branch point where a line to which the multiple connection antenna element is connected branches from a line to which the single connection antenna element is connected, a disconnection detection circuit is connected to the single connection antenna element and the disconnection detection circuit is disposed farther than the branch point relative to the single connection antenna element, and another disconnection detection circuit is connected to the multiple connection antenna element and the another disconnection detection circuit is disposed farther than the branch point relative to the multiple connection antenna element.

6. An antenna device comprising:

a plurality of H-bridge circuits each of which including a first switch set and a second switch set connected in parallel with one another, the first switch set including two switching elements connected in series and the second switch set including two switching elements connected in series, the plurality of H-bridge circuits including a first H-bridge circuit and a second H-bridge circuit;

a single connection antenna element connected between a point disposed between the two switching elements of the first switch set included in the first H-bridge circuit and a point disposed between the two switching elements of the second switch set included in the first H-bridge circuit;

a multiple connection antenna element connected between a point disposed between the two switching elements of the first switch set included in the first H-bridge circuit and a point disposed between two switching elements of second switch set included in the second H-bridge circuit; and a switching control circuit controlling a switching operation of the switching elements in response to an input of a high level signal or a low level signal to the switching control circuit, wherein the switching control circuit executes a single control to the single connection antenna element such that a current alternatively flows through the single connection antenna element in reverse directions as follows, for the first H-bridge circuit to which the single connection antenna element is connected, in response to the input of the high level signal, the switching control circuit turns on the switching element disposed on a high side in the first switch set and the switching element disposed on a low side in the second switch set, and turns off the remaining switching elements, and in response to the input of the low level signal, the switching control circuit turns on the switching element disposed on a low side in the first switch set and the switching element disposed on a high side in the second switch set, and turns off the remaining switching elements, the plurality of H-bridge circuits further include a third H-bridge circuit to which another single connection antenna element is connected, the switching control circuit executes a reverse phase concurrent control to the first H-bridge circuit and the third H-bridge circuit at the same time as follows, in response to the input of the high level signal, for the first H-bridge circuit, the switching control circuit turns on the switching element disposed on the high side in the first switch set and the switching element disposed on the low side in the second switch set, and turns off the remaining switching elements, for the third H-bridge circuit, the switching control circuit turns on the switching element disposed on the low side in the first switch set and the switching element disposed on the high side in the second switch set, and turns off the remaining switching elements, and turns off the remaining switching elements, and in response to the input of the low level signal, for the first H-bridge circuit, the switching control circuit turns on the switching element disposed on the low side in the first switch set and the switching element disposed on the high side in the second switch set, and turns off the remaining switching elements, for the third H-bridge circuit, the switching control circuit turns on the switching element disposed on the high side in the first switch set and the switching element disposed on the low side in the second switch set, and turns off the remaining switching elements.

7. The antenna device according to claim 6, wherein
the switching control circuit executes a multiple control to the multiple connection antenna element such that a current alternatively flows through the multiple connection antenna element in reverse directions as follows, for the first switch set and the second switch set to which the multiple connection antenna element is connected, in response to the input of the high level signal, the switching control circuit turns on the switching element disposed on the high side in the first switch set and the switching element disposed on a low side in the second switch set, and turns off the remaining switching elements, and in response to the input of the low level signal, the switching control circuit turns on the switching element disposed on the low side in the first switch set and the switching element disposed on a high side in the second switch set, and turns off the remaining switching elements.

8. The antenna device according to claim 6, wherein
each of the plurality of H-bridge circuits includes a branch point where a line to which the multiple connection antenna element is connected branches from a line to which the single connection antenna element is connected, and relative to the branch point, an output adjusting resistor is connected to at least one of a line between the branch point and the single connection antenna element or a line between the branch point and the multiple connection antenna element closer to the single connection antenna element or the multiple connection antenna element.

9. The antenna device according to claim 6, wherein
each of the plurality of H-bridge circuits includes a branch point where a line to which the multiple connection antenna element is connected branches from a line to which the single connection antenna element is connected, a disconnection detection circuit is connected to the single connection antenna element and the disconnection detection circuit is disposed farther than the branch point relative to the single connection antenna element, and another disconnection detection circuit is connected to the multiple connection antenna element and the another disconnection detection circuit is disposed farther than the branch point relative to the multiple connection antenna element.

* * * * *